July 25, 1939. G. M. ROSE, JR Re. 21,163

STEM FOR ELECTRON DISCHARGE DEVICES

Original Filed Feb. 28, 1936 2 Sheets-Sheet 1

INVENTOR.
GEORGE M. ROSE, JR.

BY Charles McClair
ATTORNEY.

STEM FOR ELECTRON DISCHARGE DEVICES

Original Filed Feb. 28, 1936 2 Sheets-Sheet 2

INVENTOR.
GEORGE M. ROSE, JR.

BY Charles McClair
ATTORNEY.

Reissued July 25, 1939

Re. 21,163

UNITED STATES PATENT OFFICE 21,163

STEM FOR ELECTRON DISCHARGE DEVICES

George M. Rose, Jr., East Orange, N. J., assignor, by mesne assignments, to Radio Corporation of America, New York, N. Y., a corporation of Delaware Original No. 2,066,856, dated January 5, 1937, Serial No. 66,231, February 28, 1936. Application for reissue October 8, 1937, Serial No. 168,029

9 Claims. (Cl. 250—27.5)

My invention relates to electrical devices comprising sealed containers, such as electron discharge devices and similar articles, and more particularly to a stem for such devices, and to a method for making the stem.

Electron discharge devices have been manufactured extensively with envelopes comprising cup-shaped metal shells closed at one end with a circular metal disc or header. The usual type header has welded to it a number of metal eyelets into each one of which a lead-in wire is sealed by beads of glass or similar insulation. As these beads are necessarily small, this type of header has short leakage paths and relatively low electrical resistance between the lead-in wires and the body of the header. Furthermore, this type of header is rather difficult and costly to make because of the numerous glass-to-metal and metal-to-metal seals.

An object of my invention is an improved stem construction which has maximum leakage resistance over sealing-in insulation between lead-in wires.

A further object of my invention is to provide for sealed containers, such as electron discharge devices and similar articles, an improved stem or sealing unit which can be made economically on a commercial scale.

Another object of my invention is to provide a novel and simple method for making an improved stem.

The novel features which I believe to be characteristic of my invention are set forth more particularly in the appended claims, but the invention itself will best be understood by reference to the following description taken in connection with the accompanying drawings in which:

Figure 8:
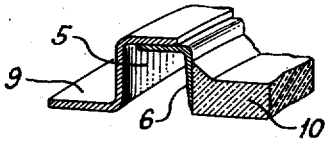

Figures 4, 5, 6, and 7 show essential parts of the apparatus for making my improved stem and the successive steps in forming a stem in accordance with my invention, and Figure 8 shows a sectional detail of a modified form of my improved stem.

Figure 1:
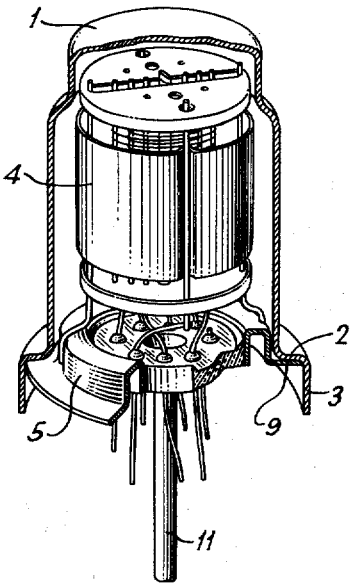
Figure 1 is a sectioned perspective view of an electron discharge device having a stem made in accordance with my invention.
Figure 2:
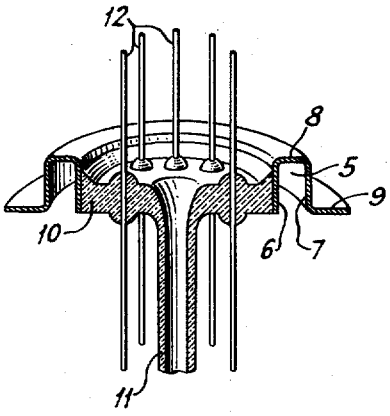
Figure 2 is a detailed sectional view of my improved stem.

In the tube shown in Figure 1, the metal envelope 1 with a flared rim or shoulder 2 and skirt portion 3 contains an electrode assembly 4 and is closed at the lower end by a header or stem, made in accordance with my invention. This stem, shown in greater detail in Figure 2, comprises a metal ring 5, U-shaped in cross section with two cylindrical portions or annuli 6 and 7 joined by a transverse section 8. The ring is formed with an outwardly extending flange 9 and may conveniently be rolled or stamped from sheet metal, such as chrome-iron or nickel-iron with the same coefficient of expansion as glass, and to facilitate welding and to reduce oxidation, the ring may be copper plated. The opening or hole of the inner cylinder 6 of the ring is closed by a glass-like stem such as a flat vitreous press or disc 10, preferably of glass joined gas-tight to the inner cylinder in any suitable manner such as by wetting the glass disc at its edge to the metal of the cylinder. The disc may be provided with a downwardly extending exhaust tube 11. Lead-in wires 12 extending through the disc are hermetically sealed therein along a circular path preferably concentric with the periphery of the disc. The lead-in wires may be such as are commonly used for radio tubes and lamps, and may be of "dumet" or a suitable alloy proportioned to have a coefficient of thermal expansion such that the wires may readily weld with the glass. After the metal ring, the glass disc and the lead-in wires are assembled to form the stem, the electrode assembly may conveniently be joined to the upper ends of the lead-in wires and the flange 9 of the stem welded in a gas tight metal-to-metal seal with the shoulder 2 of the metal shell 1 with the U-shaped portion of the ring and the enclosed glass-like stem or disc 10 projecting within the envelope.

Figure 3:
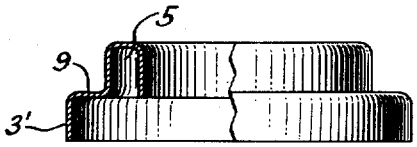
Figure 3 shows a modified form of my improved stem.
Figure 4:
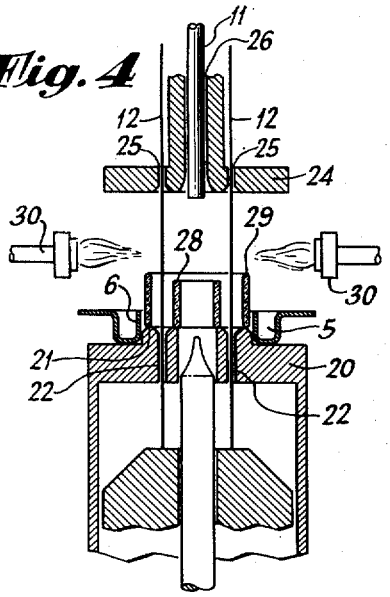

The skirt portion 3 may, if desired, be omitted from the lower portion of the metal shell and a similar skirt 3′ formed on the outer edge of the flange 9 on the stem, as shown in Figure 3.

My improved stem with the flat press 10 is of minimum vertical height and provides maximum spacing of lead-in wires which result in minimum leakage currents over and through the sealing-in insulation material. Further, my stem is particularly adapted for high speed production of fabricated metal envelopes for radio receiving tubes. The flange 9 of the stem is pressed to the flange 2 of the metal shell under a pressure of several thousand pounds by fast moving welding electrodes, and electrically welded to it by current of the order of 60,000 to 75,000 amperes passed through the annular junction of the two flanges for about one-twentieth of a second. The mechanical and thermal shock of this welding operation severely strains adjacent parts of the stem, and but for the novel stem construction of this invention the glass seals would be broken. There are three right angle bends in the metal of the ring between the metal-to-metal weld of flanges 9 and 2 and the glass-to-metal seal at 6 with a flat transverse section at 8 between the two cylindrical portions 6 and 7 to protect the glass from shock. Not only is the heat conducting path between the glass and the weld materially lengthened, but mechanical strains caused by relative movement of parts of the stem are absorbed in the three bends in the metal. Good results have been obtained by stamping ring 5 from sheet nickel iron of a thickness of about .020 inch, with the cylindrical portions 6 and 7 about .200 inch long and radially spaced about .120 inch and with the corners between cylinders 6 and 7 and the top transverse section 8 formed on a radius of curvature of about .025 inch. The nickel-iron of the ring may, if desired, be copper plated. A glass press about .100 inch thick and .670 inch in diameter and molded of soft glass comprising about ten percent lead and the usual silicates has been found to readily seal with the copper plated nickel-iron alloy of the ring and to withstand the strains and shocks of manufacturing and use.

A preferred method of manufacture and one form of apparatus suitable for making a stem in accordance with my invention is shown in Figures 4, 5, 6 and 7. This apparatus is essentially a press mold for molding the glass into shape and at the same time hermetically sealing the lead-in wires into the molded glass. This particular apparatus comprises a forming block or plate 20 having on its upper side a raised circular portion 21 with an outside diameter to snugly engage the inner wall of ring 5, which is placed in an inverted position upon the plate. The cylindrical wall 6 and the upper face of the raised portion 21 of the plate forms a press mold into which the press is molded. To position the lead-in wires during molding of the press, a number of holes 22, slightly larger than the lead-in wires, extend through the plate 20 and are arranged in a circle concentric with and somewhat smaller than the diameter of the raised portion 21. Press block 24 is suitably mounted to reciprocate in a vertical line above the forming block with openings 25 in alignment with openings 22 in the forming block and has a central opening 26 to receive exhaust tube 11. As shown, the lower end of opening 26 in the press block is flared and the lead-in wire openings 22 and 25 are countersunk to provide conical recesses which serve to mold glass around the lead-in wires on the finished stem with raised pips to increase the thickness of the glass around the lead-in wires and a fillet around the exhaust tube for strengthening the lead-in seals and the exhaust tube.

Figure 5:
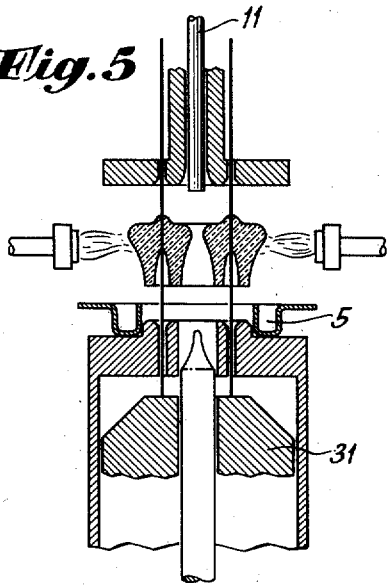
Figure 6:
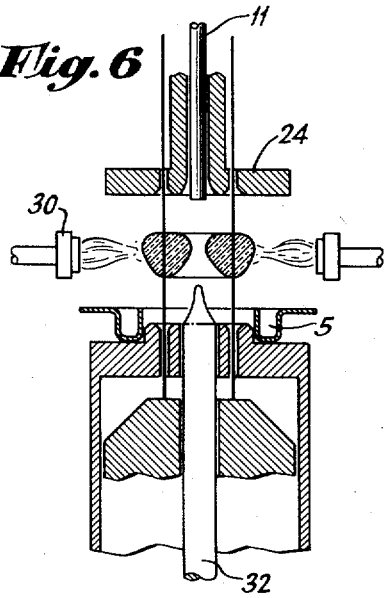
Figure 7:
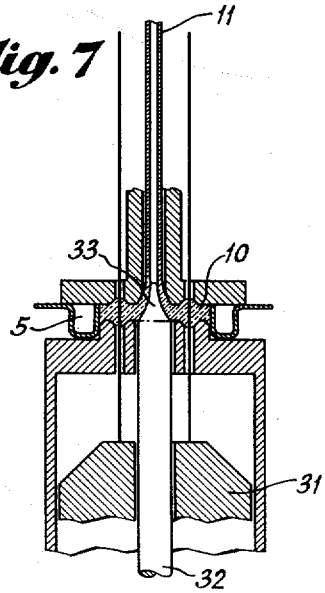

The glass for the stem is supplied in the form of two glass rings or collars 28 and 29, which, as shown, are set upon the forming block respectively inside and outside the circle of holes 22 and the lead-in wires are inserted in their holes 22 and 25 of the forming and press blocks. Heat may be conveniently applied to the glass from gas burners 30 positioned to play upon the upper rims of the glass rings. As the glass collars soften, their upper edges flow together and around the lead-in wires and form a plastic mass which adheres to the wires. To efficiently soften the glass and to minimize over-heating and oxidation of the metal ring 5, the lead-in wires and the adherent mass of glass is, according to the next step in my novel method, raised above the forming plate, as shown in Figure 5. For this purpose plunger 31 below the forming block is raised, pushing the wires and glass upwardly and into the direct path of the gas flames. Here the glass is held until it becomes sufficiently plastic to draw into a substantially uniform annulus, best shown in Figure 6. Then, plunger 31 is lowered and with the downward movement of the press block 24 the molten glass is forced into welded engagement with the inner wall of the ring and the end of the exhaust tube 11, and into the countersunk recesses about the lead-in conductors. To maintain clear the opening through the exhaust tube, plunger 32 with a pointed upper end 33, is raised, as best shown in Figure 7, to confine the molten glass exteriorly of the inner wall of the exhaust tube. The glass between the forming and press blocks rapidly cools and upon retraction of the press block, the finished stem may be removed.

The exhaust tube 11 may conveniently be used as a handle to hold the stem during assembly upon the stem of the electrode assembly. The annular flange 9 is hermetically sealed to the shoulder 2 of the metal shell, the container thus produced exhausted, and the exhaust tube 11 tipped off in the usual manner. Sealing of the exhaust tube may be done on standard machines and the finished tube may then be based in the conventional manner.

The electron discharge device which I have described may be made commercially on a stem machine of the turret type provided with the stem forming apparatus shown in Figures 4, 5, 6, and 7. The stem is easily and quickly made, is mechanically strong, and has the desirable characteristics of low interlead leakage resistance and capacity. According to a further feature of my invention, with the inside diameter of the metal envelope substantially equal to that of the outside diameter of the cylinder 7 of the ring 5, cylinder 7 effectively shields the parts inside the shell from any molten metal which may be interiorly extruded from the stem-to-envelope weld. The inner cylinder 6 of the ring 5 may be formed of thin metal which will readily weld with glass while the remainder of the ring may be formed of iron or any metal chosen for its low cost, the two metal portions of the ring being suitably joined by brazing or welding. According to a further feature of my invention, the press block 24 may during manufacture be raised, the glass press heated a second time, and the block again lowered to insure a good seal between the metal and glass parts.

While I have indicated the preferred embodiments of my invention of which I am now aware, it will be apparent that my invention is by no means limited to the exact form illustrated or to the use indicated, but that many variations may be made in the particular structure used and the purpose for which it is employed without departing from the scope of my invention as set forth in the appended claims. For convenience in defining the invention in the appended claims, the stem may be considered as a ring 5, U-shaped in cross section, with a radially extending flange 9, or considered, from a different point of view, as a flattened ring 9 with an axially extending cylinder or tubular flange 5.

I claim:

1. A stem for electron discharge devices, comprising two spaced concentric metal cylinders integrally joined at their ends by a transverse section to form a ring U-shaped in cross section, an annular flange extending radially outward from one rim of the outer cylinder of the ring, a vitreous disc closing the opening defined by the inner cylinder of the ring, and lead-in conductors sealed gas tight through said disc.

2. A stem for electron discharge devices, comprising two coaxial metal cylinders joined by a transverse section to form a ring U-shaped in cross section, an annular flange extending radially outward from the rim of the outer cylinder of the ring, a vitreous press disc with an integral exhaust tube sealed gas tight to the inner wall of the inner cylinder of the ring, and lead-in conductors sealed through said disc.

3. A stem closing member for a metal envelope, comprising a plurality of telescoped metal cylinders concentrically spaced and joined gas-tight at their ends by a transverse section of metal, an annular flange radially extending from the outermost cylinder, a vitreous disc sealed gas tight in the opening of the innermost cylinder, an exhaust tube joined to said disc, and lead-in conductors sealed gas tight through said disc.

4. An electron discharge device comprising a cylindrical metal envelope with a flared rim at one end, a stem for closing said end comprising a ring U-shaped in cross section with an annular flange extending radially outward and joined gas tight to said rim, a vitreous disc sealed gas tight in the opening of the inner wall of the ring, lead-in conductors sealed gas tight through said disc, and an electrode assembly in said envelope and connected to said lead-in conductors.

5. The method of making stems for electron discharge devices which consists in assembling on a forming device a metal annulus U-shaped in cross section and two coaxial vitreous rings, inserting lead-in conductors through the annular space defined by said vitreous rings, heating said rings to fuse them together and around said conductors, bringing a vitreous exhaust tube into contact with the softened inner ring and then pressing said vitreous rings into welded engagement with the exhaust tube and said metal annulus.

6. The method of making stems for electron discharge devices consisting in assembling upon a forming device a metal annulus U-shaped in cross section and two coaxial vitreous rings, inserting lead-in conductors through the annular space defined by said rings, heating said rings at their upper rims by radially directed flames to fuse said rims together and around said conductors, raising said conductors to elevate said rings above said forming device and into the direct path of said flames, then lowering said conductors, and then pressing the vitreous material of said rings into welded engagement with the metal annulus.

7. A tube construction comprising a tubular metal envelope closed at one end and an outwardly extending flange at the other end, a flattened ring welded to said outwardly extending envelope flange, said ring having an axially extending tubular flange forming a central opening to said envelope, a glass disc forming a closure for said opening, the edges of the disc being sealed to the inner surface of the tubular flange, the sealing area being coextensive with said edge of the disc.

8. A header, a tubular metal envelope closed at one end and having an outwardly extending flange at the other end said header comprising a flattened ring welded to the outwardly extending envelope flange, said ring having a metal cylinder extending laterally to the plane of the flattened ring and from the inner edge of the ring forming a central opening to said envelope, a glass disc forming a closure for said opening, the edges of the disc being sealed to the inner surface of the cylinder, the glass-to-metal seal being coextensive with the edge of the disc.

9. A header for closing a cylindrical envelope of an electron discharge device comprising a flattened metal ring with an integral laterally extending tubular flange, a glass wall forming a closure for the opening of the tubular flange and sealed along the edge of the wall to the inner surface of the flange, the glass-to-metal seal being co-extensive with said edge of the wall and the seal being removed from the angular junction of the ring and flange, a plurality of spaced conductors sealed gas-tight in said wall, a central hole in said wall and an exhaust tube attached to said wall in registry with said hole.

GEORGE M. ROSE, Jr.